April 7, 1931.  J. H. BAILEY  1,799,143

CHOKE VALVE FOR OIL AND GAS WELLS

Filed Nov. 14, 1929

Inventor
James H. Bailey,

By
Attorney

Patented Apr. 7, 1931

1,799,143

UNITED STATES PATENT OFFICE

JAMES H. BAILEY, OF WINK, TEXAS

CHOKE VALVE FOR OIL AND GAS WELLS

Application filed November 14, 1929. Serial No. 407,166.

The object of the invention is to provide a valve for use in connection with oil or gas wells, so that the flow of oil or gas may be readily regulated; to provide a valve of this nature which may be rigidly clamped in its adjusted position to prevent vibration when subject to the great pressure which must be encountered in this use; and to provide a valve construction of this nature which is of simple form and susceptible of cheap manufacture and low marketing cost.

With this object in view the invention consists in a construction and combination of parts of which a preferred embodiment is illustrated in the accompanying drawings, wherein.

Figures 1, 2, 3, 4:
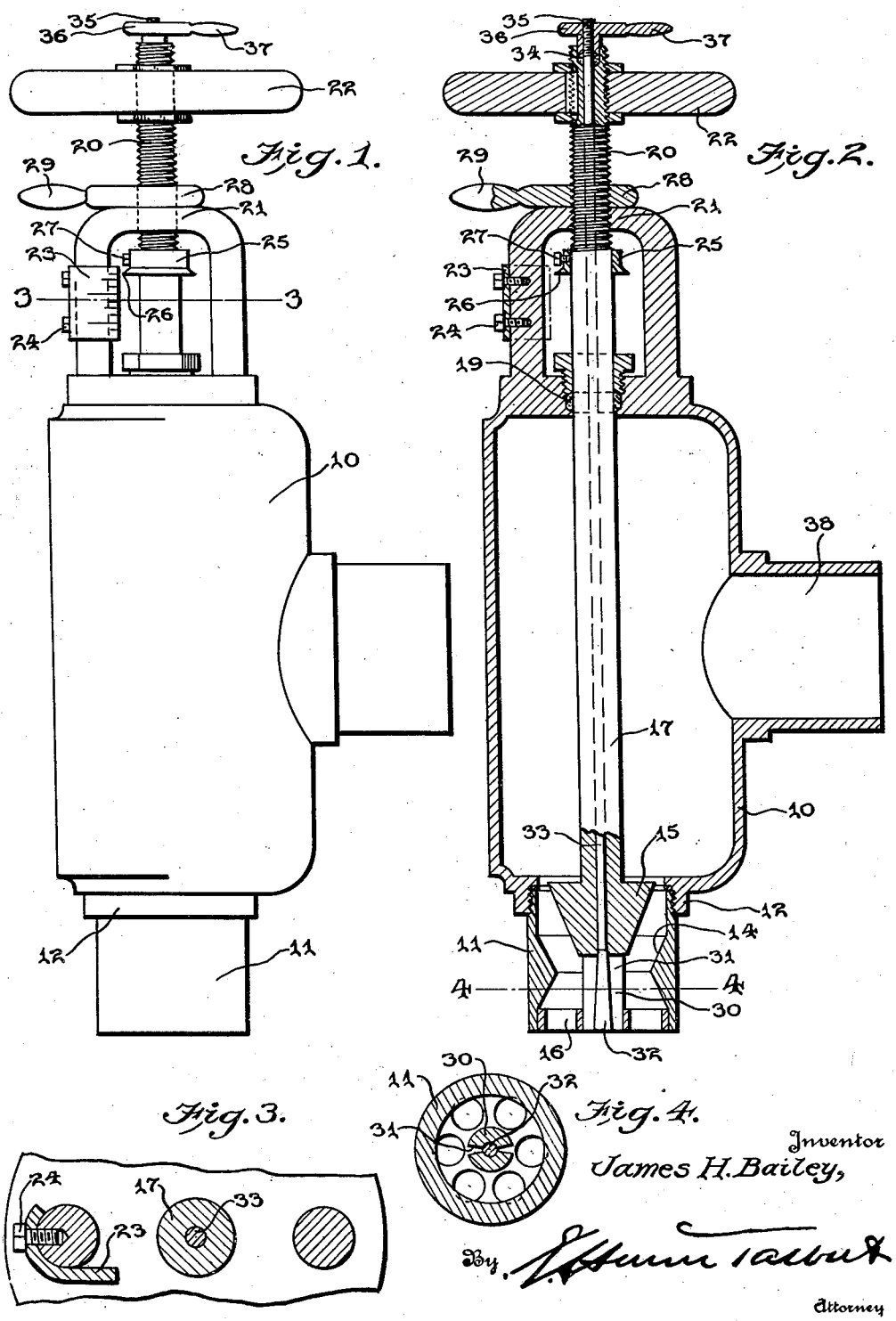
Figure 1 is an elevational view of the invention.
Figure 2 is a central vertical sectional view.

Figures 3 and 4 are transverse sectional views on the planes indicated by the lines 3—3 and 4—4 of Figures 1 and 2.

The invention comprises a cylindrical casing 10 having an axial inlet consisting of a nipple 11 threadingly engaged with an annular flange 12 formed on the casing. The nipple is interiorly formed with a tapered valve seat 14 with which the conical valve member 15 engages to close the inlet, the valve member being axially movable away from the seat to open the inlet. At the lower end of the nipple, there is provided a valve stem guide 16 which is threadingly engaged with the nipple and which is provided with a central eye forming a slide for the stem 17 by which the valve 15 is carried, the guide being formed with a series of openings in surrounding relation to the eye to provide for the passage of oil and gas through the guide.

At the upper end of the casing there is mounted a yoke 18 and the stem extends axially through the casing, passing from the latter through a stuffing box 19 and having its threaded upper end 20 engaged in an interiorly threaded eye 21 formed in the transverse bar of the yoke. A hand wheel 22 is carried at the upper end of the stem to which it is secured to permit turning of the stem.

By reason of the threaded connection with the yoke, the rotation of the stem by means of the hand wheel regulates the position of the valve 15 with reference to the seat 14 and determines the degree of opening of the valve, or effects its seating to close the inlet.

On one leg of the yoke there is mounted a scale 23 secured in position by means of cap screws 24, so that the scale may be set in the desired position on the leg. A collar 25 is mounted on the stem 17 below the cross bar of the yoke and this collar is formed at its lower edge with a flange 26 tapered to a knife edge to serve as an indicator with respect to the scale. The collar is adjustably secured to the stem by means of a cap screw 27 to enable its initial setting to the best advantage.

The position of the edge of the flange 26 when considered in connection with the scale determines the position of the valve with respect to its seat, so that a visual means is provided by which the degree of opening of the valve may be determined.

The desired setting of the valve having been once effected, means is provided for securing it in this position and in the illustrated embodiment, this means comprises a lock nut 28 carried on the threaded portion 20 of the stem and engageable with the upper face of the cross bar of the yoke 18. The lock nut is provided with a radial handle 29 by means of which firm clamping action may be effected. The handle 29 also serves as a means for manually retaining the lock nut in released position when adjusting the valve, the operation consisting first of releasing the nut and thereafter holding it in fixed position with reference to the yoke when the hand wheel may be turned to adjust the valve, after which the lock nut may be swung back into clamping position.

Since the valve in operation will be subject to a tremendous pressure which under ordinary conditions will subject it to vibration with the attendant noise of such condition and increased wear of the relatively movable parts, means is provided for effecting a clamping action at the valve proper. To this end, the stem 17 is of tubular form and the guiding portion 30 which engages the eye of the guide 16 is slotted axially as indicated at 31. See Figure 4. The guiding portion 30 of the stem is formed with a tapered bore and in this is disposed a tapered expander 32 which is carried at the lower extremity of the stem 33 extending through the stem 17 and out through a stuffing box 34 at the upper end of the latter. The stem 33 is provided with a threaded upper end 35 on which is carried a lock nut 36 smaller than but similar to the lock nut 28 and being provided with a radial handle 37. The lock nut 36 bears on the upper face of the stuffing box and when the desired adjustment of the valve 15 has been effected, the lock nut 35 is rotated and by reason of its threaded engagement with the stem 33 imparts axial movement to the latter and draws the expander 32 up into the guiding portion 30, thereby radially extending the latter into firm clamping engagement with the eye of the guide 16, so that there is then a rigid connection between the guiding portion 30 of the stem and the guide 16 that will effectively resist any tendency to vibration of the valve by reason of the high pressure. In releasing the expander, it is only necessary to impart reverse turning movement to the nut 36 and then unseat the expander by a tap or blow at the upper end of the stem 33.

The outlet to the casing 10 is in the form of a lateral nipple 38 disposed at the longitudinal center of the casing.

The invention having been described what is claimed as new and useful is:

1. A device of the kind indicated comprising a valve, a stem on which the valve is carried, a guide in which a portion of the stem slides, and means for radially expanding the stem in the region of the guide to bind it in engagement with the latter.

2. A device of the kind indicated comprising a valve, a casing enclosing the same, a stem slidably entering the casing and carrying the valve, a yoke mounted on the casing and having a threaded engagement with the stem, means for rotating the stem, a scale carried on the yoke, and a collar mounted on the stem and formed with an annular flange tapered to a knife edge and constituting an indicator in connection with the scale, the scale being adjustably mounted on one leg of the yoke and the collar being adjustable on the stem.

3. A device of the kind indicated comprising a casing having an inlet nipple and a guide mounted in the same, a stem slidably mounted in the casing and having a portion slidable in the guide, a valve mounted on the stem just above said portion, means for imparting axial movement to the stem to selectively position the valve with reference to the inlet nipple, the latter having a seat for the valve, and means for radially expanding said slidable portion of the stem to effect binding engagement between the same and the guide.

4. A device of the kind indicated comprising a casing having an inlet nipple and a guide mounted in the same, a stem slidably mounted in the casing and having a portion slidable in the guide, a valve mounted on the stem just above said portion, means for imparting axial movement to the stem to selectively position the valve with reference to the inlet nipple, the latter having a seat for the valve, and means for radially expanding said slidable portion of the stem to effect binding engagement between the same and the guide, the stem being of tubular form and said slidable portion having a tapered bore and axial slots, and the expanding means consisting of a tapered expander and a stem connected with the same and passing slidably through the valve stem and provided with a means for effecting its movement axially with reference to the valve stem.

In testimony whereof he affixes his signature.

JAMES H. BAILEY.